United States Patent [19]

Booth

[11] 3,956,621
[45] May 11, 1976

[54] ASYNCHRONOUS BINARY ARRAY DIVIDER

[75] Inventor: William C. Booth, Reisterstown, Md.

[73] Assignee: The Singer Company, New York, N.Y.

[22] Filed: July 22, 1969

[21] Appl. No.: 843,501

[52] U.S. Cl. .............................................. 235/164
[51] Int. Cl.² ........................................... G06F 7/54
[58] Field of Search ..................... 235/164, 156, 175

[56] References Cited
UNITED STATES PATENTS

| | | | |
|---|---|---|---|
| 2,879,001 | 3/1959 | Weinberger et al. | 235/175 |
| 2,954,168 | 9/1960 | Maddox | 235/175 |
| 3,064,896 | 11/1962 | Carroll et al. | 235/164 |
| 3,105,897 | 10/1963 | Heijn | 235/175 |
| 3,188,453 | 6/1965 | Schneider | 235/175 |
| 3,229,079 | 1/1966 | Zink, Jr. | 235/164 |
| 3,257,548 | 6/1966 | Fleisher et al. | 235/164 |
| 3,378,677 | 4/1968 | Waldecker et al. | 235/164 |
| 3,437,801 | 4/1969 | Wilhelm, Jr. | 235/175 |

*Primary Examiner*—David H. Malzahn
*Attorney, Agent, or Firm*—William Grobman; James C. Kesterson

[57] ABSTRACT

This invention comprises an asynchronous binary divider which incorporates a plurality of subtractors connected in such a manner as to shift the difference from one operation to the next. The information flows through the divider with the results appearing at the output without the need for a clock. The divider of this invention uses a plurality of subtractors which receive the divisor and subtract it from the dividend and subsequent remainders. A generated borrow from the most significant digit of the first subtractor indicates whether or not the dividend is larger than the divisor. The individual bits of the remainder generated by the first subtraction are fed to logic circuits comprising a pair of AND gates and an OR gate, and the outputs from the logic circuits determine the values applied to the next row of subtractors. The remainder generated by each successful subtraction is used as the minuend for the next, the divisor is used as the subtrahend for each subtraction and the inverted borrow from the most significant bit of each subtractor serves as the quotient digit in each subtraction row. The remainders at the end of the operation consists of the outputs from the final logic circuits.

2 Claims, 5 Drawing Figures

INVENTOR.
WILLIAM C. BOOTH

ASYNCHRONOUS BINARY ARRAY DIVIDER

This invention relates to asynchronous computer circuits and more particularly to asynchronous dividers for binary numbers.

Most computers in use today are synchronous computers. That is, every operation performed by the computer is timed and occurs upon the generation of a clock pulse which is applied to the circuits which are to perform the operations. The use of synchronizing clocks serves to tie all of the computer operations together in time so that even though the computer as a whole may be carrying out several separate and distinct operations, the results of the separate operations will be available for use at prescribed times. In addition, where dynamic memories are used, synchronous operation is required. A dynamic memory is one wherein the information in storage circulates through a delay circuit or line. In such a memory, the memory locations at which information is to be inserted or removed are available at the input and output gates only at prescribed times. For the computer to operate, the internal operations must be synchronized so that the information is available from memory when needed, and the proper memory location for the storage of additional information is available when required.

Of course, the rate of operation of synchronous computers is limited to the repetition rate of the clock which must be sufficiently slow to permit the slowest operation to proceed. This means that all faster operations are tied to the slower rate, and the equipment as a whole has a rather low time efficiency. Since the primary utilization of electronic computers and the reason for their phenomenal growth is the high speed with which they operate, each innovation which adds to the speed of operation increases the utilization of the computer as a whole. For this reason, the use of asynchronous computers and computer circuits has been actively pursued even in spite of the increased complexity of such computers.

It is an object of this invention to provide new and improved computer devices.

It is another object of this invention to provide new and improved electronic computer means.

It is a further object of this invention to provide a new and improved electronic divider.

It is still another object of this invention to provide a new and improved electronic divider which does not depend upon timed pulses for its operation.

Other objects and advantages of this invention will become more apparent as the following description proceeds, which description should be considered together with the accompanying drawings in which.

Figure 1:
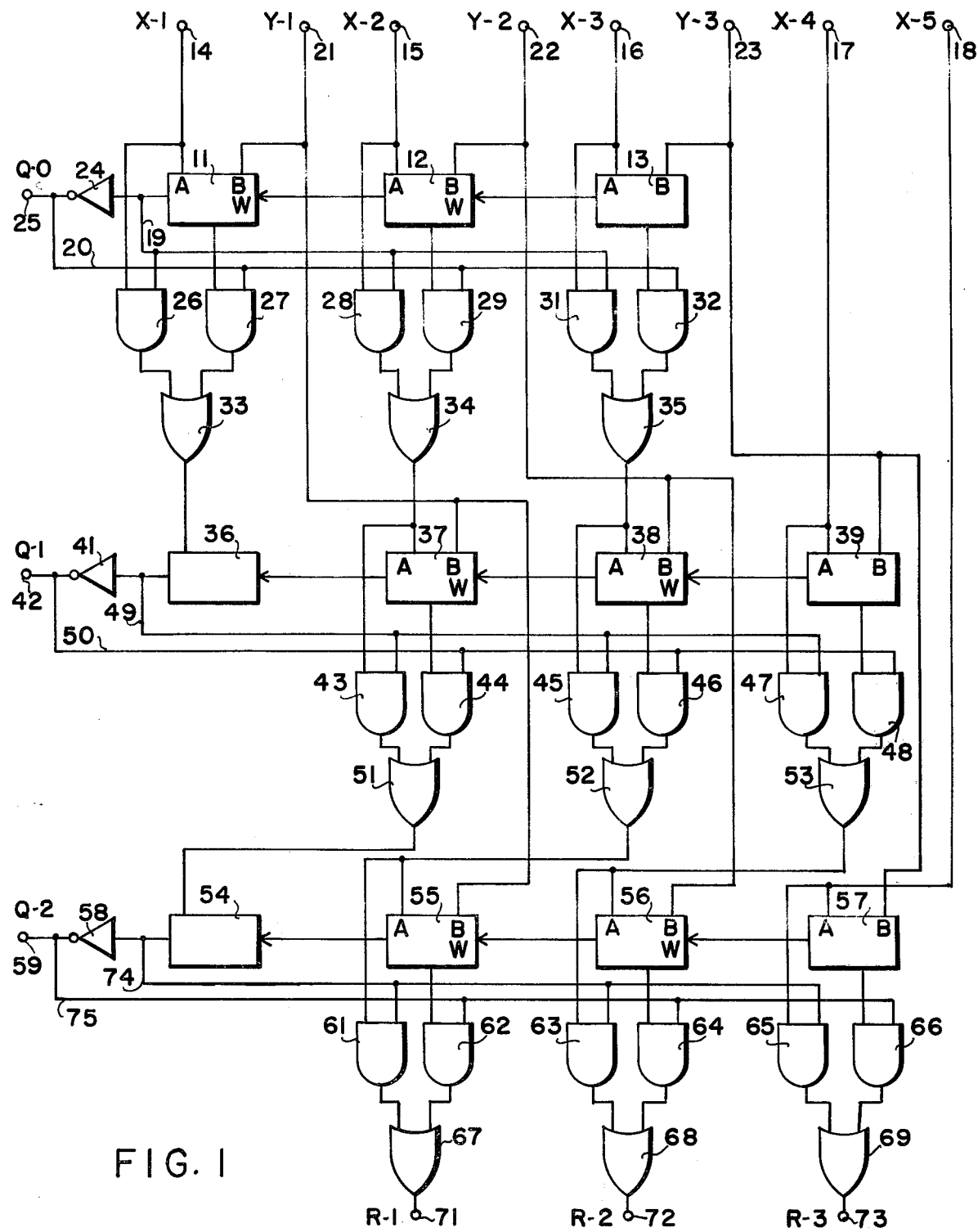
FIG. 1 is a block diagram of a sample divider according to this invention.

Referring now to the drawings in detail, the reference characters 11, 12 and 13 designate a row of digital subtractors, each of which has three inputs and two outputs. The inputs are the individual digits of the divisor, the dividend and the borrow from the lower order stage; and the outputs are the difference and the borrow to the next higher order stage. The input terminals 14, 15, 16, 17 and 18 are the terminals to which the individual digits of the dividend are applied, and the input terminals 21, 22 and 23 are the input terminals to which the divisor digits are applied. In the example shown in FIG. 1 only three digits will comprise the divisor and the quotient, but the principles of this invention can be used to construct a system having any number of digits. The dividend normally contains twice the number of digits that the divisor and quotient contain, and five or six digit terminals are supplied for the dividend. Terminals 14 and 21 are the terminals to which the highest value digits of the dividend and the divisor are applied. The terminal 14 is connected to the minuend input of the subtractor 11 and the input terminal 21 is connected to the subtrahend input of the subtractor 11; the input terminal 15 is connected to the minuend input and the input terminal 22 to the subtrahend input of the subtractor 12; and the input terminal 16 is connected to the minuend input and the input terminal 23 is connected to the subtrahend input of the subtractor 13. The borrow output of the subtractor 11 is applied through an inverter 24 to the first quotient digit output terminal 25. The difference output is applied to one input of a coincidence gate 27, and the minuend input terminal 14 is also applied to one input of another coincidence gate 26. The other input to the gate 27 is applied from the output of the inverter 24, and the other input to the gate 26 is applied from the borrow output. The outputs from the two gates 26 and 27 are connected as the two inputs to an OR gate 33 whose output is applied to the minuend input of a subtractor 36, which is the highest order subtractor of the next row. The borrow input to the subtractor 11 comes from the borrow output of the subtractor 12 which has its difference output applied to one input of a coincidence gate 29. The other input to the gate 29 is applied from the output of the inverter 24, and the inputs to the companion gate 28 come from the minuend input terminal 15 and the borrow output of the subtractor 11. The output from the two gates 28 and 29 are applied as the two inputs to an OR gate 34, the output from which is applied to one input (the minuend input) of a subtractor 37 in the second row of subtractors. The inputs to the subtractor 12 are applied from the dividend input terminal 15, the divisor input terminal 22 and the borrow output from the subtractor 13. The subtractor 13 receives inputs from the dividend terminal 16 and the divisor input terminal 23, and its difference output is applied to one input of a gate 32, the other input to which is derived from the output of the inverter 24. A companion gate 31 has one input connected to the terminal 16 and another input connected to the borrow output of the subtractor 11. The outputs from the gates 31 and 32 are applied to the inputs of an OR gate 35 whose output is applied to the minuend input of a subtractor 38 in the second row of subtractors. The inputs to the second row of subtractors from the first row of subtractors is to the minuend inputs. The subtrahend inputs to the same subtractors come from the actual divisor input terminals. However, the minuend input is from one order, and the subtrahend (divisor) input is from the next higher order. Thus, the divisor is effectively shifted to the left after each operation.

The second row of subtractors contains subtractors 36, 37, 38 and 39, with the subtractor 36 representing the highest order. The subtractor 36 has two inputs, one, as mentioned above, being applied from the output of the gate 33 and the other, the borrow input, being applied from the borrow output from the next subtractor 37. The subtractor 36 has a single output, the borrow output, and it is applied through an inverter 41 to an output terminal 42 which represents the second quotient digit. The subtractor 37 has three inputs, the minuend input being supplied from the output of the gate 34, the subtrahend input being supplied from the divisor input terminal 21, and the borrow input being supplied from the borrow output of the next lower order subtractor 38. The difference output from the subtractor 37 is connected to one input of a coincidence gate 44, the other input to which is connected to output from the inverter 41. The minuend input to the subtractor 37 is also applied to one input of a companion coincidence gate 43, the other input to which is supplied from the borrow output of the subtractor 36. The outputs from the two gates 43 and 44 are supplied to the two inputs of an OR gate 51 whose output is applied as the minuend input to a third row subtractor 54. Subtractor 38, similar to subtractor 37, has three inputs. The minuend input to the subtractor 38 is connected to the output from the gate 35, the subtrahend input is connected to the divisor input terminal 22, and the borrow input is from the borrow output of the subtractor 39. Subtractor 39 has only two inputs, the minuend input from the input terminal 17 and the subtrahend input from the divisor input terminal 23, since there is no lower order subtractor from which to receive a borrow input. The difference output from the subtractor 38 is applied as one input to a coincidence gate 46 which has its other input applied from the output of the inverter 41, and a companion gate 45 has one input applied from the borrow output of the subtractor 36 and its other input from the minuend input to the subtractor 38. The difference output from the subtractor 39 is applied as one input to a coincidence gate 48 which receives its other input from the output of the inverter 41. The two inputs to the companion coincidence gate 47 come from the borrow output of the subtractor 36 and the minuend input to the subtractor 39. The outputs from the gates 45 and 46 are applied as inputs to the OR gate 52 whose output supplies the minuend input to a subtractor 55 in the third row of subtractors, and the output from the gates 47 and 48 are applied as inputs to an OR gate 53 whose output is applied as the minuend input to a subtractor 56 in the third row of subtractors.

The third row of subtractors comprises subtractors 54, 55, 56 and 57, of which subtractor 54 is the highest order and which has only a minuend input from the output of gate 51 and a borrow input from the borrow output of the subtractor 55. The subtractor 54 applies its borrow output to an inverter 58 which feeds an output terminal 59 representing the lowest order quotient digit. The minuend input to the subtractor 55 is applied from the output of the gate 52, and the subtrahend input comes from the input terminal 21. The difference output from the subtractor 55 is applied to one input of a gate 62 whose other input comes from the output of the inverter 58. One input to a companion gate 61 comes from the borrow output of the subtractor 54, and the other input is applied from the minuend input of the subtractor 55. The output from the two gates 61 and 62 are applied as the two inputs to an OR gate 67 whose output represents the highest order remainder digit. In addition, the subtractor 55 has a borrow input which comes from the borrow output of a subtractor 56. The minuend input to the subtractor 56 comes from the output of gate 53, and the subtrahend input comes from the divisor input terminal 22. The difference output of the subtractor 56 is applied as one input to a gate 64 whose other input comes from the output of the inverter 58. A companion gate 63 has one input applied from the borrow output of the subtractor 54 and another from the minuend input to the subtractor 56. The outputs from the gates 63 and 64 are applied as the two inputs to an OR gate 68 whose output applied to the terminal 72 represents a remainder digit. The borrow input to the subtractor 56 comes from the borrow output of the subtractor 57 whose minuend input comes from the input terminal 18 and whose subtrahend input comes from the divisor input terminal 23. The difference output of the subtractor is connected to one input of a gate 66, the other input of which comes from the output of the inverter 58. A companion gate 65 has one input applied from the borrow output of the subtractor 54 and the other input applied from the minuend input to the subtractor 57. The outputs from the gates 65 and 66 are applied as the two inputs to an OR gate 69 whose output is connected to a terminal 73 which represents the lowest order remainder.

The operation of the system of FIG. 1 parallels standard long division performed on a piece of paper. When long division is performed, an estimate is first made of the number of times the divisor will go into the most significant portion of the dividend which has the same number of digits. Then the product of the estimated amount times the divisor is subtracted from the most significant digits of the dividend to determine a remainder. If the estimate was correct, it becomes the first digit of the quotient and the remainder is less than the divisor and not negative. If the remainder is greater than the divisor, the estimate is increased and the multiplication and subtraction are repeated. If the remainder is negative, the estimate is decreased and the multiplication and subtraction are repeated. This process is repeated until a correct estimate is obtained. Then, the next digit of the dividend is brought down to become the lowest order digit of the remainder, and either the remainder is shifted to the left one order or the divisor is shifted to the right one order and the process is repeated. This continues until all of the digits of the dividend have been used. The final remainder is the remainder from the division, and the estimates become the quotient digits. In implementing this method of long division, one major distinction is considered. The apparatus of this invention is to be used only with binary numbers, therefore in each estimating step there are only two choices. Or, put another way, the quotient digit is either one or zero. This simplifies the logic and the implementation.

Figures 2, 3:
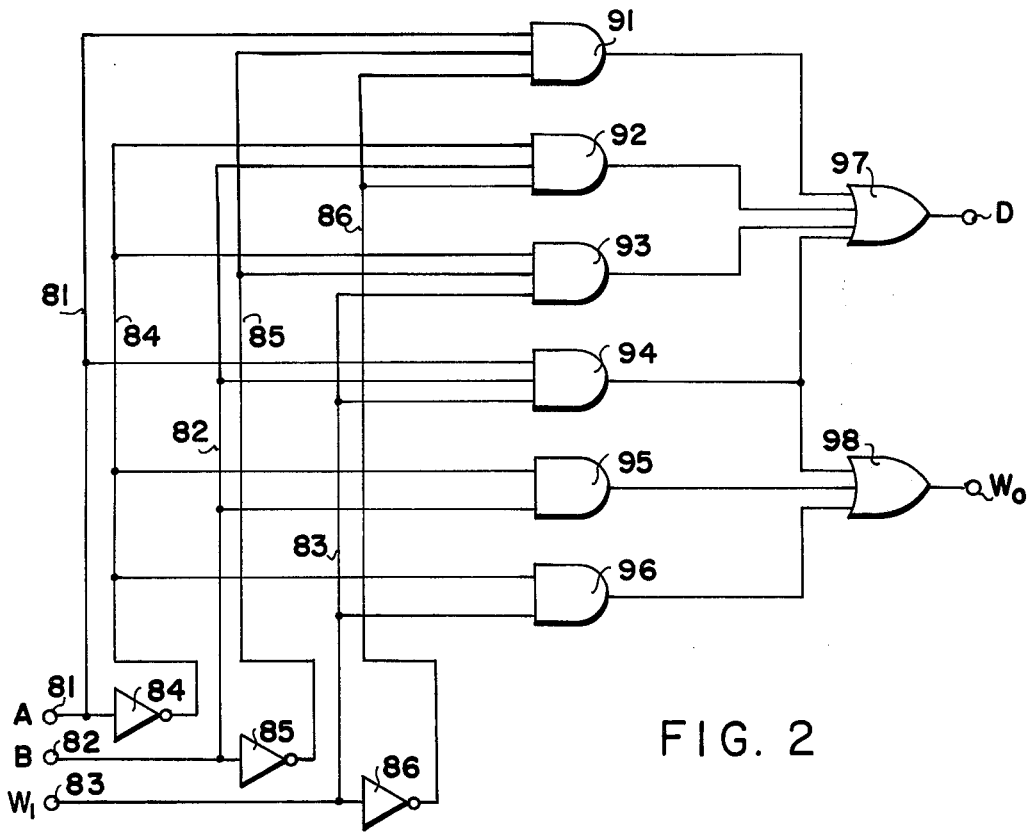
FIG. 2 is a block diagram of the details of a typical subtractor useful in the system of FIG. 1.
FIG. 3 is a chart which illustrates the "truth table" for the subtractor of the system of FIG. 2.

Each of the subtractors 11, 12 and 13 in the first row of subtractors has a dividend digit and a divisor digit applied to it. The divisor is subtracted from the dividend. By this logic, the estimate of the first digit is predetermined. It is assumed that the divisor can be successfully subtracted from the dividend and that the first quotient digit is one. The details of the subtractor and the method of operation is shown in FIGS. 2 and 3 and will be described later. However, assume that the dividend is 00110 and that the divisor is 011. Then, terminals 14 and 21 will have zeros applied to them;

terminal 15 will have a zero and terminal 22 a one applied to them; terminals 16 and 23 will have ones applied to them; terminal 17 will have a one; and terminal 18 will have a zero applied to it. The subtractor 13 has at its minuend input a one and at its subtrahend input a one. The difference output applied to the gate 32 is a zero, and there is no borrow. The subtractor 12 has a zero applied to its minuend input and a one applied to its subtrahend input. The difference output applied to the gate 29 is a one, and a one is borrowed from the subtractor 11. The subtrahend digit and the minuend digit applied to the subtractor 11 are both zeros, and this would ordinarily result in a zero difference. But since one is being borrowed from the subtractor 11 by the subtractor 12, the difference applied to the gate 27 is a one, and a one is applied at the borrow output to the inverter 24. This results in a zero at the terminal 25, showing the first quotient digit to be zero. From the above it is now possible to determine the input to the gates 26, 27, 28, 29, 31 and 32. Gate 32 has two zeros and passes no output. Gate 31 has two ones at its inputs and applies a one through the OR gate 35 to the minuend input to the subtractor 38. Both of the gates 28 and 29 have mixed ones and zeros at their inputs and pass no outputs, and the same is true of the two gates 26 and 27, so that the minuend inputs to the subtractors 36 and 37 have zeros applied to them.

The two inputs to the subtractor 39 are ones, so the difference output is zero, and there is no borrow. Similarly, the two inputs to the subtractor 38 are ones, so the difference and the borrow outputs are zero. The two inputs to the subtractor 37 are zeros with no borrow, so the difference and the borrow outputs are zero. And with no borrow applied to the subtractor 36 and a single zero at its minuend input, there is no borrow from the subtractor 36. Thus, the input to the inverter 41 is zero and its output at the terminal 42 is one, making the second quotient digit a one. The inputs to the gate 43 are both zeros and the inputs to each of the gates 44, 45, 46, 47 and 48 are mixed, so only zeros are passed through the OR gates 51, 52 and 53. The subtrahend input to the subtractor 57 is a one and the minuend input is a zero which results in a difference output to the gate 66 of a one and a borrow to the subtractor 56. The minuend input to the subtractor 56 is also a zero and its subtrahend input is a one. This would result in a difference output of one and a borrow to the subtractor 55, but the borrow from the subtractor 57 renders the difference output a zero instead. Both inputs to the subtractor 55 are zero, but the borrow from the subtractor 56 results in a difference output of a one and a borrow from the subtractor 54. Since the minuend input to the subtractor 54 is zero, there is no subtrahend input, and there is a borrow from the subtractor 55, the borrow output applied to the inverter 58 input is a one, resulting in a zero output from the inverter 58 and a zero at the terminal 59. The last quotient digit is a zero, making the quotient 010. Gate 64 has two zeros applied to its inputs, and each of the gates 61, 62, 63, 65 and 66 has mixed inputs, so that the outputs to the remainder terminals 71, 72 and 73 are zeros, making the remainder all zeros. Thus, from the above it can be seen that for each digit, a subtraction is performed and it is assumed that the divisor is smaller than the dividend. The outputs from the subtractors of each row are applied to the gates which indicate to the following stages whether or not the assumption visor  dend is true. As shown above, the system of this invention operates to divide a binary dividend by a binary divisor rapidly in an asynchronous manner.

As mentioned above, the system of FIG. 1 has provision for only five dividend digits, although most dividends contain the number of digits that is the sum of the number that the divisors and quotients contain. But the system of FIG. 1 has been provided to explain the basic principles in the system of this invention and is but exemplary. Many variations are possible. For example, had the system of FIG. 1 been provided with four rows of subtractors and the dividend used therein with six digits as would have been expected, the first row of subtractors would have indicated the relative values of the dividend and the divisor. In long division, the operation always starts with the highest order digits. Therefore, the first step indicates by the value of the borrow from the highest order subtractor whether the divisor is smaller than the dividend. In fixed point division, should the output of the first row of subtractors equal one, then the result of the division is ignored because the divisor is larger than the dividend and it cannot be determined how much larger it is. In floating point division, the dividend and divisor must first be normalized before division takes place. Normalizing a binary number means that the first digit must be one, and this is accomplished by shifting before division. Since both the dividend and divisor have ones in the most significant digits for floating point operations, we are assured that the dividend is less than twice the divisor. Therefore, we can be sure that the output from the first row of subtractors represents the most significant digit of the quotient and the result of the division is valid. If the first quotient digit in floating point division is one, the quotient would normally be shifted right one digit to obtain a normalized quotient. This shifting is accomplished by separate logic circuits after the division process is complete.

In FIG. 1, the subtractors 11–13, 36–39, and 54–57 are shown merely as blocks having a plurality of inputs and outputs. These subtractors may take the form shown in FIG. 2. Assuming that the apparatus shown in FIG. 2 is contained in any of the subtractor blocks shown on FIG. 1, then three inputs and two outputs are provided. Three input terminals 81, 82 and 83 receive the three input signals to the subtractor, with the minuend digit being applied to the terminal 81, the subtrahend digit being applied to the terminal 82 and the borrow input being applied to the terminal 83. Inverter 84 is connected to the input terminal 81, inverter 85 is connected to the terminal 82 and inverter 86 is connected to the terminal 83. In this manner, two signals are provided for each input digit. The signal applied to the terminal carries the same designation as the terminal, and the signal output from any inverter carried the same designation as the inverter. The input terminal 81 is also connected to one input of AND gates 91 and 94, the input terminal 82 is also connected to one input of AND gates 92, 94 and 95, and the input terminal 83 is connected to one input of AND gates 93, 94 and 96. The output of the inverter 84 is connected to another input to gates 92, 93, 95 and 96. The output from the inverter 85 is connected as one input to each of the gates 91 and 93, and the output of the inverter 86 is connected as one input to each of the gates 91 and 92. An OR gate 97 has applied to its inputs the outputs from the gates 91, 92, 93 and 94, and another OR gate 98 has applied to its inputs the outputs from the gates 94, 95 and 96. The output from the gate 97 is the difference and the output from the gate 98 is the borrow.

The arrangement of FIG. 2 is organized to accomplish the results indicated in the table of FIG. 3. In this table, there are three input columns, one for the minuend (A), one for the subtrahend (B) and one for the borrow ($W_1$). The various combinations of input signals are shown in these three input columns and the output results are shown in the two output columns which represent the difference (D) and the borrow ($W_0$). Since there are three separate inputs, there are eight combinations which result in eight different outputs. When the three inputs 81, 82 and 83 have zeros applied to them, both the difference output and the borrow output will be zero as shown in FIG. 3. Using this example to analyze the operation of the structure shown in FIG. 2, the lines 81, 82 and 83 carry zeros while the lines 84, 85 and 86, the outputs from the inverters, carry ones. Therefore, gate 91 has mixed inputs from the lines 81 and 85, gate 92 has mixed inputs from the lines 82 and 84, gate 93 has mixed inputs from the lines 83 and 84, gate 94 has all zeros applied to its inputs from the lines 81, 82 and 83, gate 95 has mixed inputs from lines 82 and 84, and gate 96 has mixed inputs from lines 83 and 84. Thus, none of the gates passes a one to its output, and the two outputs from gates 97 and 98 are zero. Consider another combination which obtains different results. Suppose the minuend digit is zero, the subtrahend digit is one and the borrow digit is one, then according to the fourth line in the chart of FIG. 3, the difference digit should be zero and the borrow digit should be one. Following the operation of the system of FIG. 2, the line 81 has a zero, the line 82 has a one, the line 83 has a one, the line 84 has a one, and the lines 85 and 86 have zeros on them. Therefore, the gate 91 will have three zeros at its inputs and will pass a zero, the gate 92 has mixed inputs and is closed, gate 93 has mixed inputs and is closed, gate 94 has mixed inputs and is closed, gate 95 has two ones at its inputs and passes a one, and gate 96 has two ones on its inputs and passes a one. Thus, the OR gate 97 has a zero output, and the OR gate 98 has a one output; the difference output is zero and the borrow output is one. Additional examples can be shown, but they would be repetitive. The interconnections of the apparatus shown in FIG. 2 are arranged to accomplish the results set forth in the table of FIG. 3. The apparatus illustrated in FIG. 2 is one form that such apparatus can take.

Figure 4:
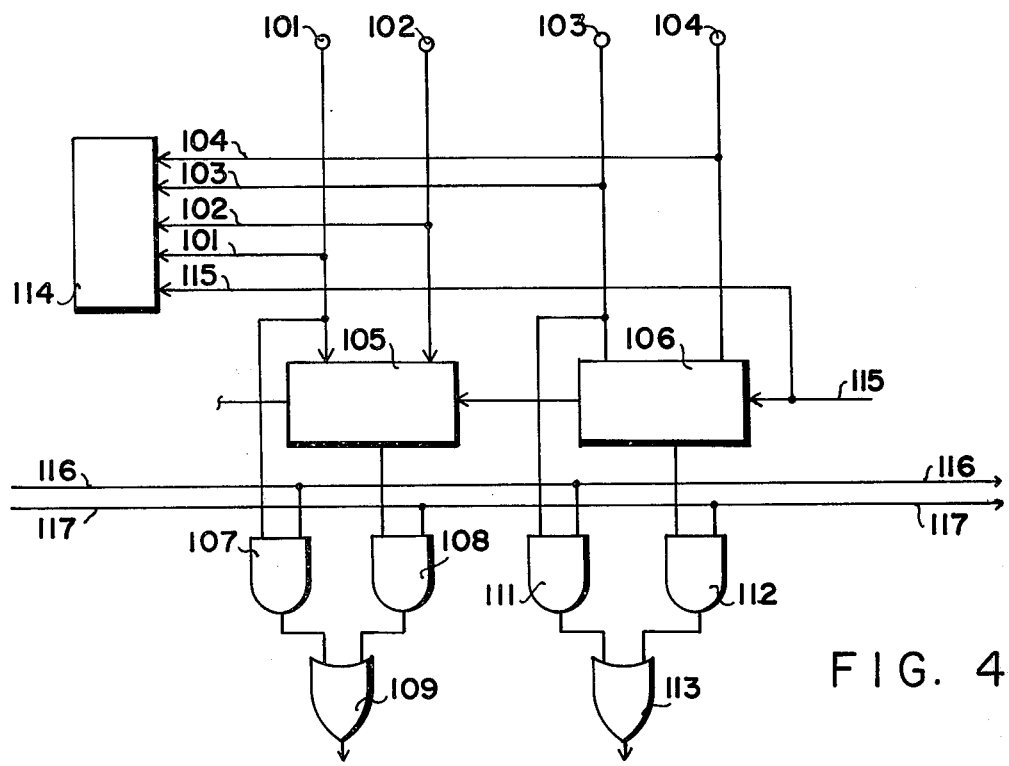
FIG. 4 is a block diagram of a portion of a system according to this invention which accomplishes borrow propagation by two digits at a time.
Figure 5:
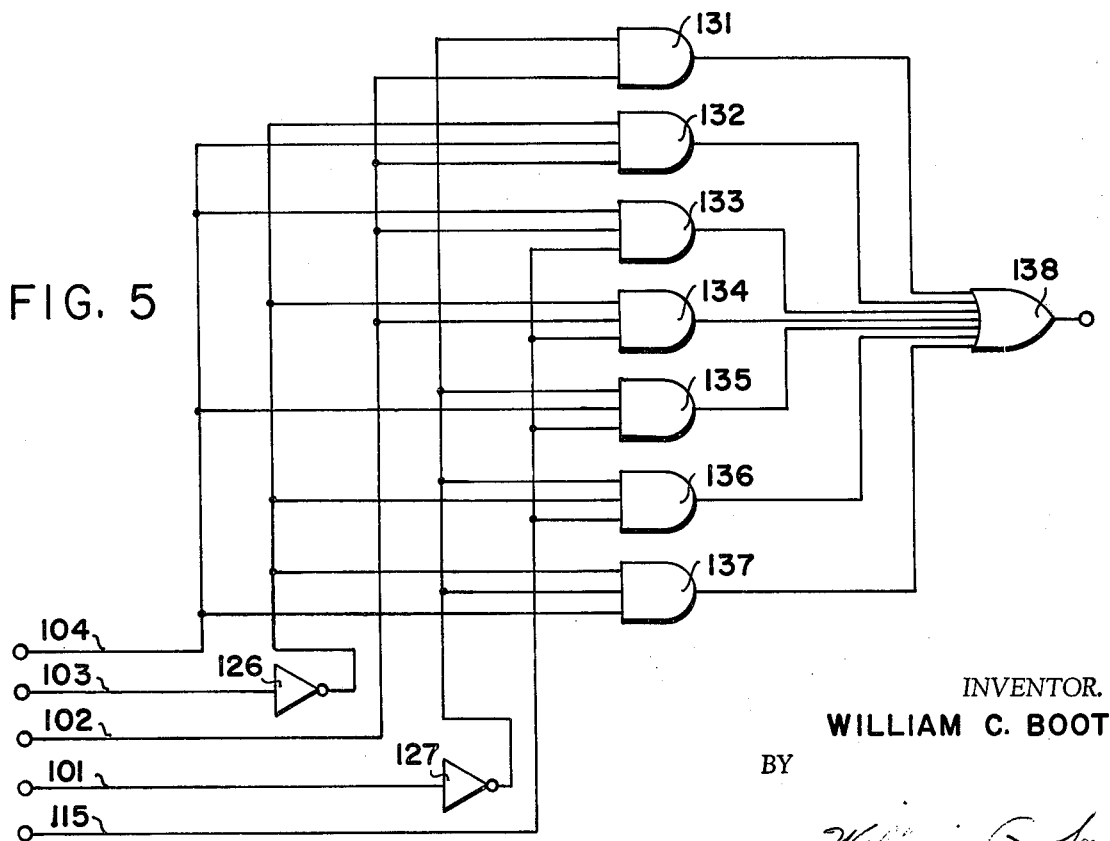
FIG. 5 is a block diagram of the details of a borrow generator for the system of FIG. 4.

As pointed out above, one of the main advantages in going to an asynchronous system is the additional speed of operation obtained over synchronous machines. In the operation of the system shown in FIG. 1, the difference from the subtractor is passed on to the next row of subtractors, but the borrow is passed on to the next subtractor in the same row. This means that the higher order subtractors cannot reach a final result until all of the results from the lower order subtractors have been reached. One way in which the overall operation of the divider can be speeded up is shown in FIGS. 4 and 5. FIG. 4 is a fragmentary view of a portion of the divider of FIG. 1 with borrow processor 114 added. In FIG. 4 input terminals 101, 102, 103 and 104 are adapted to receive information from a previous row of subtractors as shown in FIG. 1, and are connected to the inputs to subtractors 105 and 106. The terminal 101 is connected to the minuend input and terminal 102 to the subtrahend input of the subtractor 105, and terminal 103 is connected to the minuend input and terminal 104 to the subtrahend input of the subtractor 106. In addition, a borrow output 115 from a lower order subtractor is connected to the borrow input of the subtractor 106, and the borrow output from the subtractor 106 is connected to the borrow input to the subtractor 105. The borrow output from the subtractor 105 is not used. In addition to the above, each of the inputs 101–104 and 115 is connected as an input to a borrow generator 114. The difference output from the subtractor 105 is applied as one input to an AND gate 108 whose other input is supplied from a line 117, which, as shown in FIG. 1, carries the output of the output inverters (not shown). The two inputs to a companion AND gate 107 are supplied from a line 116 which, as shown in FIG. 1, is connected to the borrow output of the highest order subtractor (not shown here), and from the input terminal 101. The outputs from the two gates 107 and 108 are applied as the inputs to an OR gate 109, whose output supplies the next row of subtractors. Similarly, the difference output from the subtractor 106 is applied to one input of an AND gate 112 whose other input comes from the line 117. The inputs to a companion gate 111 are applied from the line 116 and the input terminal 103. The outputs from the gates 111 and 112 are applied as the inputs to an OR gate 113 whose output supplies information to the next row of subtractors.

As mentioned above, the apparatus shown in FIG. 4 is a fragment of the system of FIG. 1 with the addition of a borrow generator 114. Generally, the system of FIG. 4 operates the same as the system of FIG. 1. In the system of FIG. 1, the subtractor 106 cannot reach its final answer until it receives borrow information on line 115. Thus, in the fragment shown in FIG. 4, subtractor 105 cannot send the proper difference result to the gate 108 until subtractor 106 has finished its computation, and then subtractor 105 is in a position to perform its computation. If it takes 5 nanoseconds to compute the difference and borrow in a subtractor, it takes subtractor 105, 10 nanoseconds to reach its result because it must wait for subtractor 106. To speed up this time, the system of FIG. 4 uses a special borrow computer 114 for each pair of subtractors. All of the information is supplied along the lines 101, 102, 103, 104 and 115 simultaneously to the subtractors 105 and 106 and to the borrow generator 114. Therefore, the subtractors 105 and 106 operate as described above with respect to FIG. 1, and at the same time the borrow generator 114 computes the borrow to be passed on to the next pair of subtractors. This cuts the computation time per pair of subtractors in half. Consider the apparatus of FIG. 4. Information is applied simultaneously to the input terminals 101–104 and to the borrow line 115. Information is then simultaneously available at the outputs of the subtractor 106 and at the output of the borrow generator 114. In the mean time the subtractor 105 receives its input information including the borrow information from the subtractor 106, and it computes its results. The output information from the subtractor 105 does not include any borrow information. Therefore, the borrow information generated by the generator 114 is available to the next subtractor (not shown) which computes its results during the same time the subtractor 105 is performing its computation. The time of propagation of a final result is increased substantially by the use of the borrow generator 114.

The borrow generator 114 is shown in detail in block form in FIG. 5. It comprises input terminals 101–104 and 115. The terminal 103 is connected to an inverter 126 whose output is applied as one input to AND gates 132, 134, 136 and 137, and the terminal 101 is connected to an inverter 127 whose output is applied as one input to AND gates 131, 135, 136 and 137. The terminal 104 is directly connected as one input to each of the AND gates 132, 135, 133 and 137. The terminal 102 is directly connected as one input to each of AND gates 131, 132, 133 and 134, and the terminal 115 is directly connected as one input to each of AND gates 133, 134, 135 and 136. The outputs from the gates 131–137 are all applied as inputs to an OR gate 138, whose output is the computed borrow passed on to the next pair of subtractors.

The borrow generator 114 is so arranged that the various combinations of input signals applied to the lines 101–104 and 115 produce the proper borrow. Since this information is available at the beginning of a subtraction, the final borrow information to be passed on to the next subtractor pair can be readily determined. For example, assume that terminals 102 and 103 have ones and that the other terminals have zeros applied to them. The output from the subtractor 106 will be a one on the difference output and a zero on the borrow to subtractor 105. The output from the subtractor 105 would be a one on the difference output and a one on the borrow output. Consider the same situation applied to FIG. 5. Gate 131 has a one applied to it from the inverter 127 and a one from the terminal 102 and is open. All of the other gates 132–137 have mixed inputs and are closed. Therefore, a one is applied to the OR gate 138 from the gate 131 and there is a one generated by the borrow generator. This is the same result obtained from the subtractors 105 and 106 themselves.

Although the use of a borrow generator such as 114 instead of using the output from the subtractor 105 (in the example of FIG. 4) does cut the time of the overall division, it is at the expense of additional equipment. This raises the complexity of the entire system, increases the general maintenance, and reduces the reliability of operation. Since the number of components required in a borrow generator increases with the square of the number of subtractors being passed over, pairing the subtractors is considered to be a good compromise between additional speed and additional equipment.

The above specification has described a new and improved system for dividing binary numbers without the use of synchronized equipment. The system of this invention is rapid and simple in its operation, increasing the speed and reliability of the divider while utilizing a simple configuration.

What is claimed is:

1. A flow-through electronic digital divider comprising a plurality of digital subtractors arranged in a plurality of rows; each of said subtractors having at least a minuend input, a subtrahend input and a borrow input, and at least a difference output and a borrow output; each of said subtractors in a first row defining an order of magnitude of the dividend and each of said subtractors in the other rows defining an order of magnitude of the remainders; first means for applying to the individual minuend inputs of the subtractors in said first row individual dividend digits; second means for supplying to the individual subtrahend inputs of said subtractors individual subtrahend digits; at least one borrow generator in each row of subtractors; means for applying to the inputs of said borrow generator in each row the digits applied to the minuend and subtrahend inputs of that row of subtractors; and means for passing the difference output digits from one subtractor in one row to the minuend input of a subtractor in the subsequent row; said borrow generator in each row comprising means for generating borrow digits from the inputs applied to pairs of subtractors defining adjacent orders of magnitude, said borrow generating means having at least one output and a plurality of inputs, means for connecting said inputs to receive the digital input information applied to the inputs of the pair of subtractors.

2. The divider defined in claim 1 wherein each of said subtractors comprises a decoding matrix: said matrix having three inputs for receiving information representing a dividend or remainder digit, a divisor digit, and a borrow digit; means connected to each of said inputs for obtaining the inverse of the input information; and a series of gates each having a plurality of inputs connected to said inputs and to said inversion means, said gates being interconnected to produce from the applied input information the appropriate difference and borrow digits for each combination of input digits.

* * * * *